United States Patent
Hu et al.

(10) Patent No.: US 11,689,388 B2
(45) Date of Patent: Jun. 27, 2023

(54) VIRTUAL NETWORK FUNCTION ENABLED SECURE COMMUNICATION SYSTEMS AND METHODS

(71) Applicant: Avast Software s.r.o., Prague (CZ)

(72) Inventors: Bin Hu, Los Altos, CA (US); Rajarshi Gupta, Los Altos, CA (US)

(73) Assignee: Avast Software s.r.o., Prague (CZ)

(*) Notice: Subject to any disclaimer, the term of this patent is extended or adjusted under 35 U.S.C. 154(b) by 231 days.

(21) Appl. No.: 17/034,719

(22) Filed: Sep. 28, 2020

(65) Prior Publication Data
US 2022/0103398 A1    Mar. 31, 2022

(51) Int. Cl.
  H04L 29/06    (2006.01)
  H04L 12/46    (2006.01)
  H04L 9/40     (2022.01)

(52) U.S. Cl.
  CPC ...... *H04L 12/4641* (2013.01); *H04L 12/4633* (2013.01); *H04L 63/1408* (2013.01); *H04L 63/1441* (2013.01)

(58) Field of Classification Search
  CPC ............. H04L 12/4641; H04L 12/4633; H04L 63/1408; H04L 63/1441
  USPC ............................................. 726/22
  See application file for complete search history.

(56) References Cited

U.S. PATENT DOCUMENTS

| | | | |
|---|---|---|---|
| 2008/0198858 A1* | 8/2008 | Townsley | H04L 61/2535 370/392 |
| 2020/0275357 A1* | 8/2020 | Bordeleau | H04W 76/12 |

* cited by examiner

*Primary Examiner* — Evans Desrosiers
(74) *Attorney, Agent, or Firm* — Dovas Law, P.C.

(57) ABSTRACT

A method for enabling secure communication. The method includes providing a first virtual network function ("VNF") at a first network location and providing a second VNF at a second network location. A first Layer 3 virtual private network ("L3 VPN") tunnel is constructed by the first VNF and the second VNF between the first network location and the second network location, and a first local area network ("LAN") at the first network location and a second LAN at the second network location are connected by the first L3 VPN tunnel. Further provided is a method for establishing a secure communication environment.

20 Claims, 8 Drawing Sheets

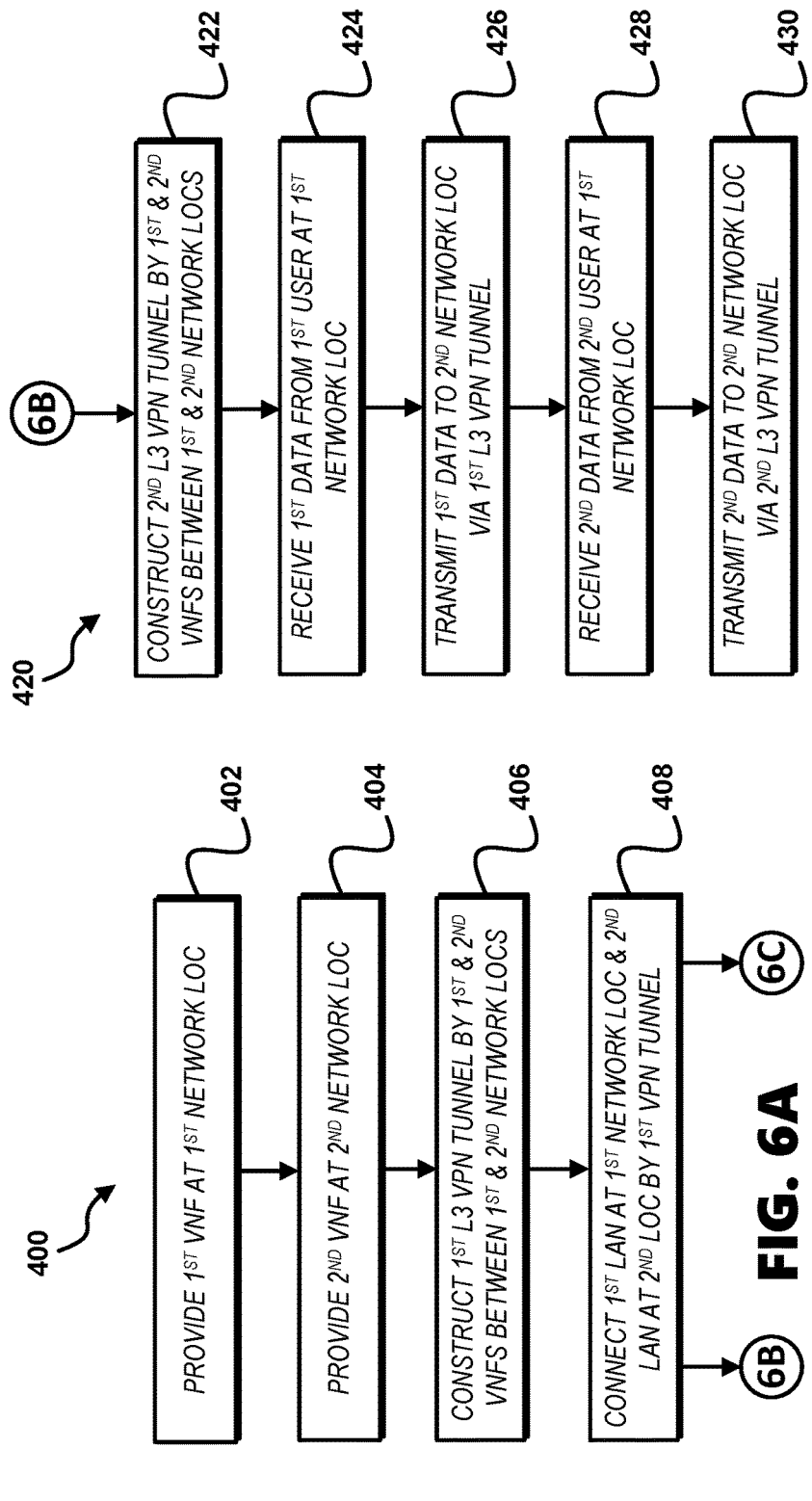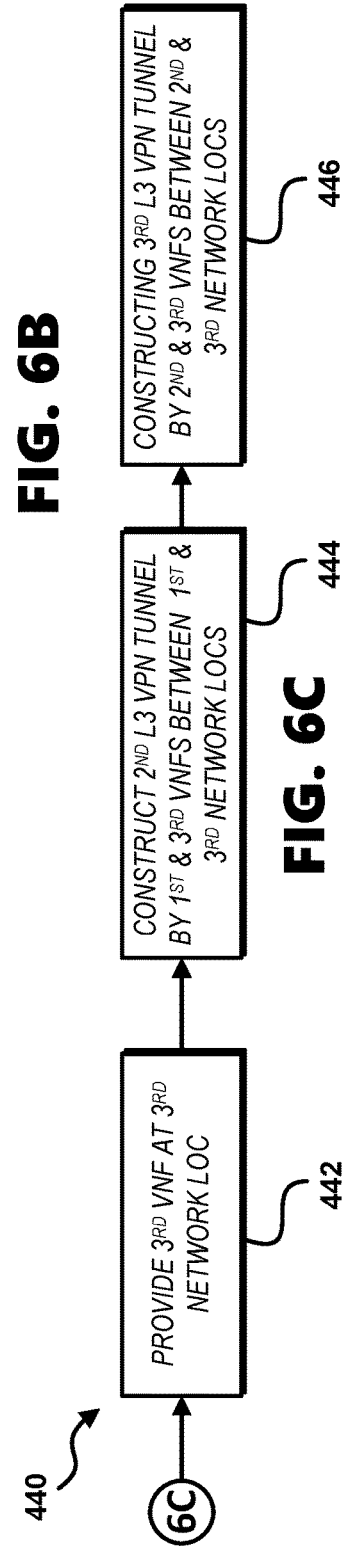

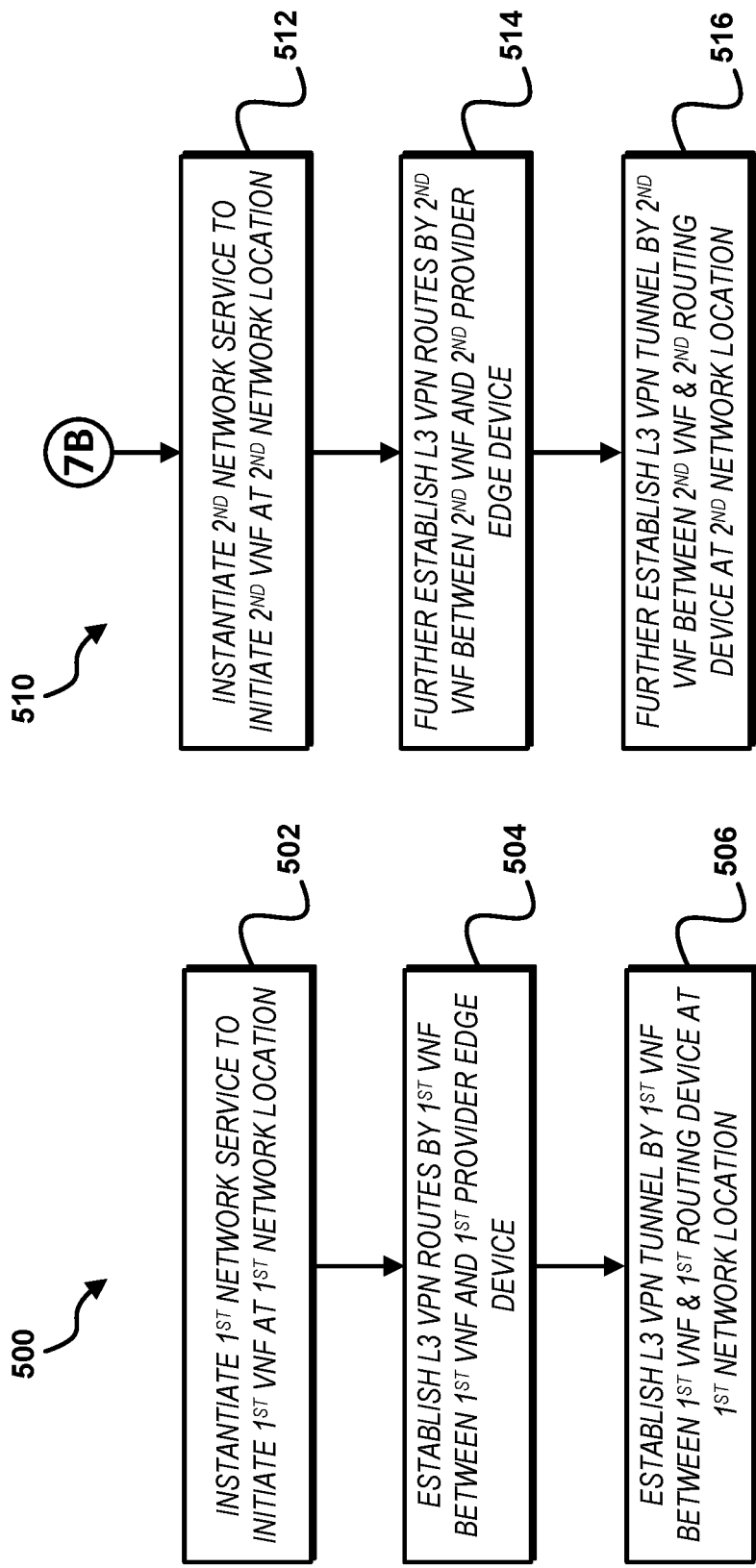

VIRTUAL NETWORK FUNCTION ENABLED SECURE COMMUNICATION SYSTEMS AND METHODS

FIELD OF INVENTION

The invention relates generally to secure communication, and more particularly to secure network communication over a virtual private network ("VPN").

BACKGROUND

Computing environments are continually becoming less centralized. Computer users have expectations that their applications, data, and systems will be available from anywhere on any device at any time. These expectations have created challenges in maintaining data security over network communications. Businesses in particular struggle to maintain the security of their intellectual property, customer and employee information, and other sensitive data which may be compromised when employees and agents access company data from remote locations using public network infrastructure. Businesses are likely to employ a multisite local area network ("LAN") to connect users to different company sites. Typical multisite LANs are connected either with WAN or private fiber link and are often complex and expensive to implement.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for enabling secure communication is provided. The method includes providing a first virtual network function ("VNF") at a first network location and providing a second VNF at a second network location. A first Layer 3 virtual private network ("L3 VPN") tunnel is constructed by the first VNF and the second VNF between the first network location and the second network location, and a first local area network ("LAN") at the first network location and a second LAN at the second network location are connected by the first L3 VPN tunnel.

Further provided is a method for establishing a secure communication environment. The method includes instantiating a first network service to initiate a first virtual network function ("VNF") at a first network location. Layer 3 virtual private network ("L3 VPN") routes are established by the first VNF between the first VNF and a first provider edge device for distribution by a provider via a border gateway protocol ("BGP"), and an L3 VPN tunnel is established by the first VNF between the first VNF and a first routing device at the first network location.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

FIGS. 6A, 6B, and 6C are diagrams showing methods for enabling secure communication in a network.

FIGS. 7A and 7B are diagrams showing methods establishing a secure communication environment in a network.

Figure 8:
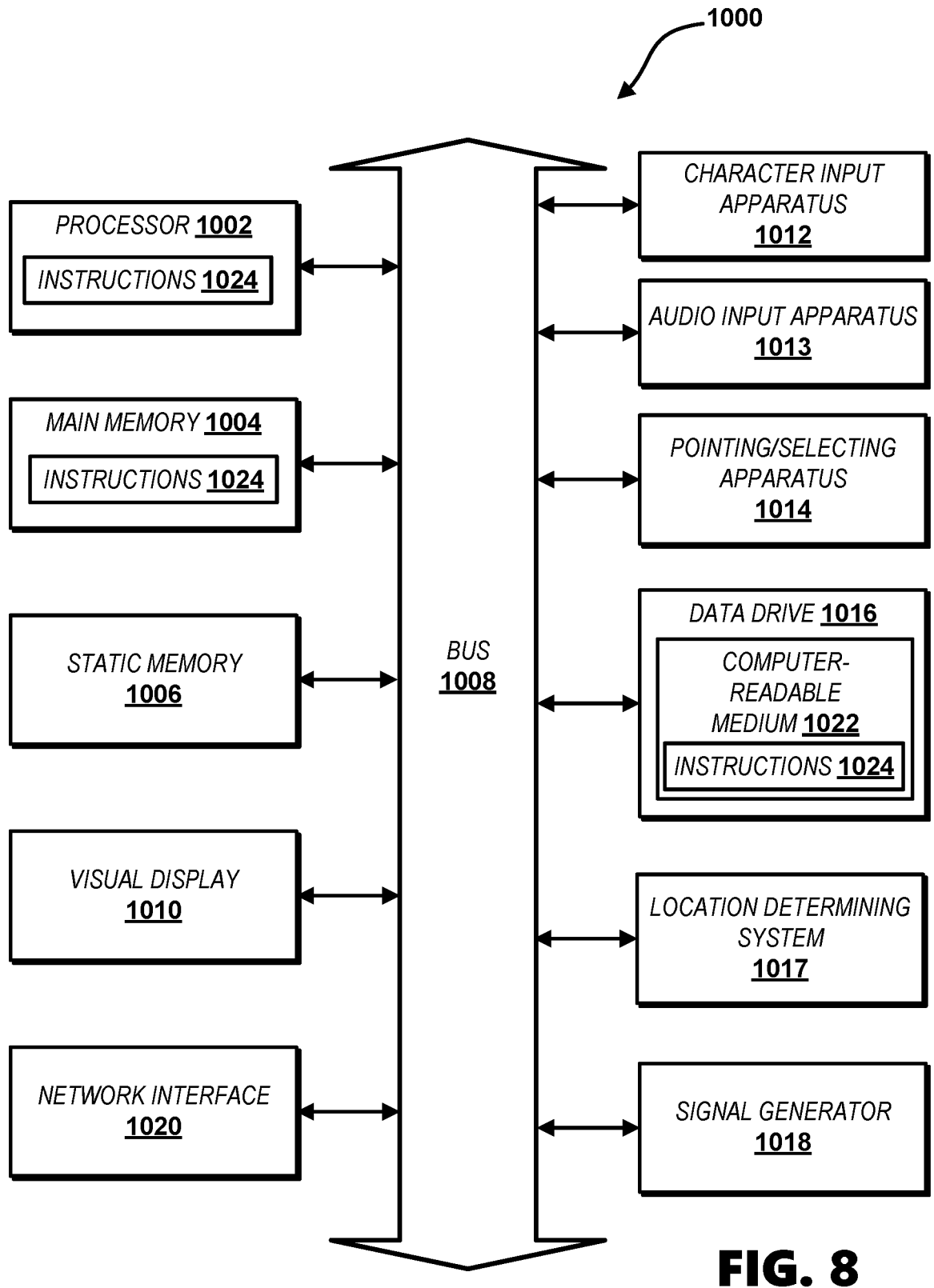

FIG. 8 shows an illustrative computer system for performing described methods according to the illustrative embodiments.

DETAILED DESCRIPTION OF ILLUSTRATIVE EMBODIMENT(S)

Embodiments are described herein with reference to the drawing figures wherein like numerals represent like elements throughout. The terms "a" and "an" as used herein do not denote a limitation of quantity, but rather denote the presence of at least one of the referenced items.

Virtual network functions ("VNFs") are described herein for building tunnels to enable devices at two or more physical premises to communicate with each other in private and secure settings. Local area networks ("LANs") at two or more premises are connected into one local area network ("LAN"). Tunnels are built at edges of the LANs using a Layer 3 virtual private network.

A Layer 3 virtual private network ("L3 VPN") is a virtual private network mode constructed and delivered on technologies of the third layer (i.e., the "network layer") of the Open Systems Interconnection ("OSI") model. Exemplary tunneling methods of an L3 VPN include multiprotocol label switching Layer 3 virtual private network ("MPLS L3 VPN") and virtual private routed network ("VPRN"). Alternatively, other tunneling methods including virtual extensible LAN ("VxLAN"), user datagram protocol ("UDP"), or generic routing encapsulation ("GRE") can be used. An L3 VPN tunnel can be enabled for example by an open platform virtual private network server, for instance a server operating OpenVPN™ in layer 3 mode.

An L3 VPN uses Layer 3 virtual routing and forwarding ("VRF") to segment routing tables, and routes are exchanged between a service provider edge ("PE") and user sites (e.g., customer sites). Multiprotocol BGP ("MP-BGP") can be used for example to transport VPN constructs between PEs, for instance via a software-defined networking ("SDN") controller. Alternatively, an SDN controller can directly configure a PE using other protocol (e.g., Open-Flow) instead of MP-BGP, for example via software-defined networking in a wide area network ("SD-WAN") or in a Multiprotocol Label Switching ("MPLS") backbone. An L3 VPN is differentiated from a Layer 2 virtual private network ("L2 VPN") in that an L2 VPN is constructed and delivered on the technologies of the second layer (i.e., the "data link layer") of the OSI Model. Particularly, L3 VPN packets require only network layer packet headers (e.g., IP headers), while L2 VPN packets require network layer packet headers and data link layer packet headers (e.g., Ethernet headers).

In a business setting for example, connecting LANs at different physical premises enables an employee, a business owner, or a business services provider to gain private and secure access to company resources at different locations. A company's chief information security officer ("CISO") for example is enabled to solve home networking or information technology problems of others while operating from a location (e.g., the CISO's home) different from the locations (e.g., company headquarters or an employee's home) where problems occur. An owner of a small or medium sized business ("SMB") for example is enabled to connect devices at several homes or offices with each other, for example printers and internet protocol ("IP") phones. A third party services provider for example is enabled to manage device activity and security of computing systems at many premises of a particular customer allowing for enhancements in device management and security.

Figure 1:
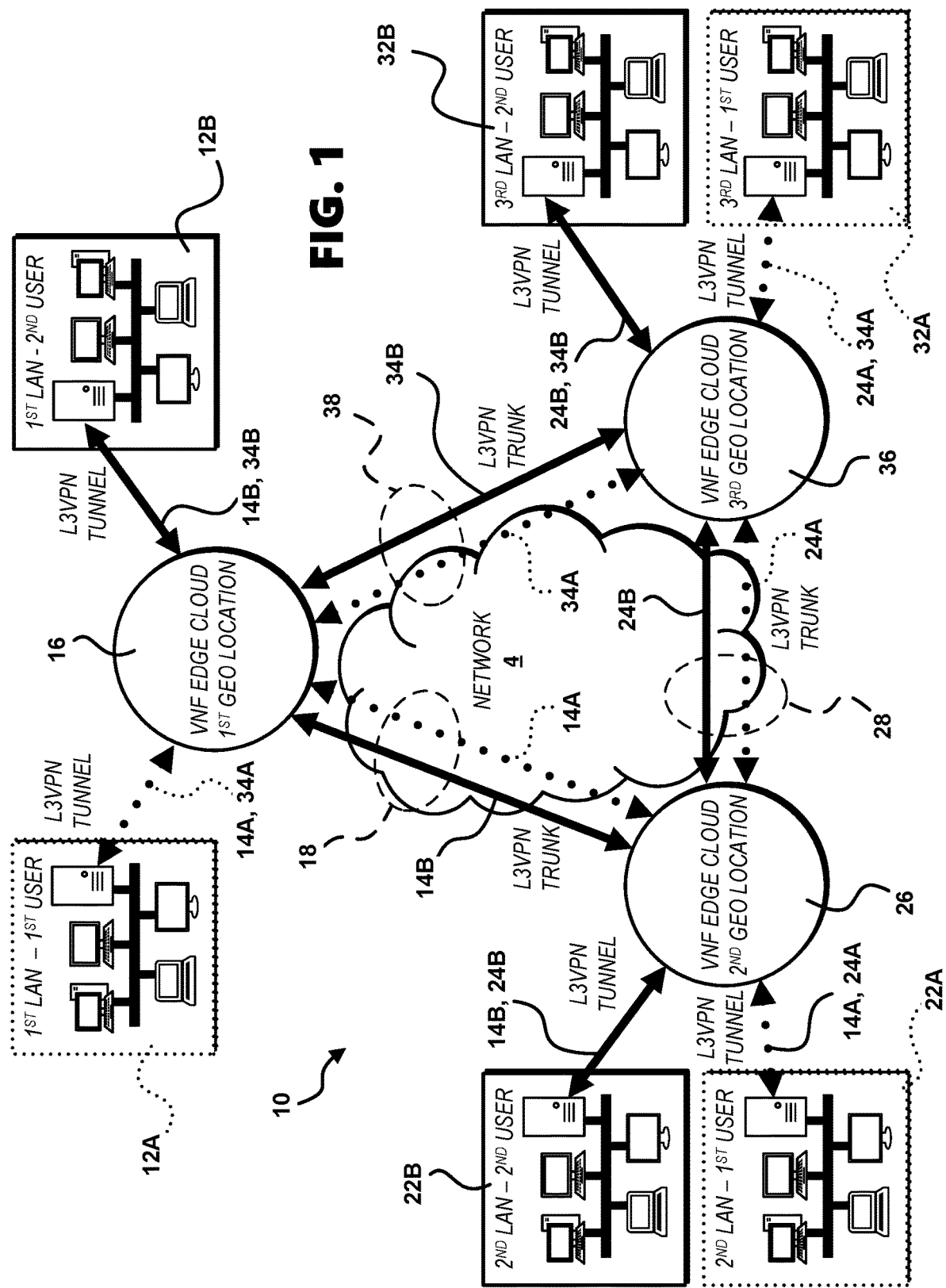
FIG. 1 is a diagram showing a virtual network function ("VNF") enabled multisite local area network ("LAN") according to illustrative embodiments.

Referring to FIG. 1, a virtual network function ("VNF") enabled multisite LAN 10 is provided in a communications network 4. The communication network 4 includes one or more wired or wireless networks or a combination thereof, for example a local area network (LAN), a wide area network (WAN), the Internet, mobile telephone networks, and wireless data networks such as WiFi™ and 3G/4G/5G cellular networks. The communication network 4 enables communication between a first LAN 12A, 12B, a second LAN 22A, 22B, and a third LAN 32A, 32B, each of which is located in a separate physical location. For purpose of visualization the first LAN 12A, 12B is shown as operated by a first user (first LAN 12A) and a second user (first LAN 12B), the second LAN 22A, 22B is shown as operated by the first user (second LAN 22A) and the second user (second LAN 22B), and the third LAN 32A, 32B is shown as operated by the first user (third LAN 32A) and the second user (third LAN 32B). It should be understood that first LAN 12A and first LAN 12B are physically the same LAN, second LAN 22A and second LAN 22B are physically the same LAN, and third LAN 32A and third LAN 32B are physically the same LAN.

A first VNF on a first edge cloud 16 at a first geographic location and a second VNF on a second edge cloud 26 at a second geographic location construct a first Layer 3 virtual private network ("L3 VPN") tunnel 14A for the first user and a first L3 VPN tunnel 14B for the second user in a first L3 VPN trunk 18. The second VNF on the second edge cloud 26 and a third VNF on a third edge cloud 36 construct a second L3 VPN tunnel 24A for the first user and a second L3 VPN tunnel 24B for the second user in a second L3 VPN trunk 28. The first VNF on the first edge cloud 16 and the third VNF on the third edge cloud 36 construct a third L3 VPN tunnel 34A for the first user and a third L3 VPN tunnel 34B for the second user in a third L3 VPN trunk 38. The first LAN 12A, the second LAN 22A, and the third LAN 32A as operated by the first user are connected into the multisite LAN 10 by the first, second, and third L3 VPN tunnels 14A, 24A, 34A for the first user, allowing devices connected to the first, second, and third LANs 12A, 22A, 32A to see each other in a private and secure setting. Likewise, the first LAN 12B, the second LAN 22B, and the third LAN 32B as operated by the second user are connected into the multisite LAN 10 by the first, second, and third L3 VPN tunnels 14B, 24B, 34B for the second user, allowing devices connected to the first, second, and third LANs 12B, 22B, 32B to see each other in a private and secure setting. It would be understood by one of skill in the art that the multisite LAN 10 could be extended to any number of L3 VPN connected LANs (i.e., two or more L3 VPN-connected LANs).

The first, second, and third VNFs on the first, second, and third edge clouds 16, 26, 36 function as L3 VPN hosts which are trusted entities and shield the respective first, second, and third LANs 12A, 12B, 22A, 22B, 32A, 32B from attacks. The L3 VPN hosts (i.e., the VNFs on the edge clouds 16, 26, 36) work with their respective edge clouds 16, 26, 36 and their respective LANs 12A, 12B, 22A, 22B, 32A, 32B to enable enhanced security software updates to ensure security of LAN-terminated and edge-terminated traffic. Communication among the L3 VPN hosts (i.e., the VNFs on the edge clouds 16, 26, 36) are encrypted and secure, and traffic originating at the LANs 12A, 12B, 22A, 22B, 32A, 32B is masqueraded at the L3 VPN hosts.

Figure 2:
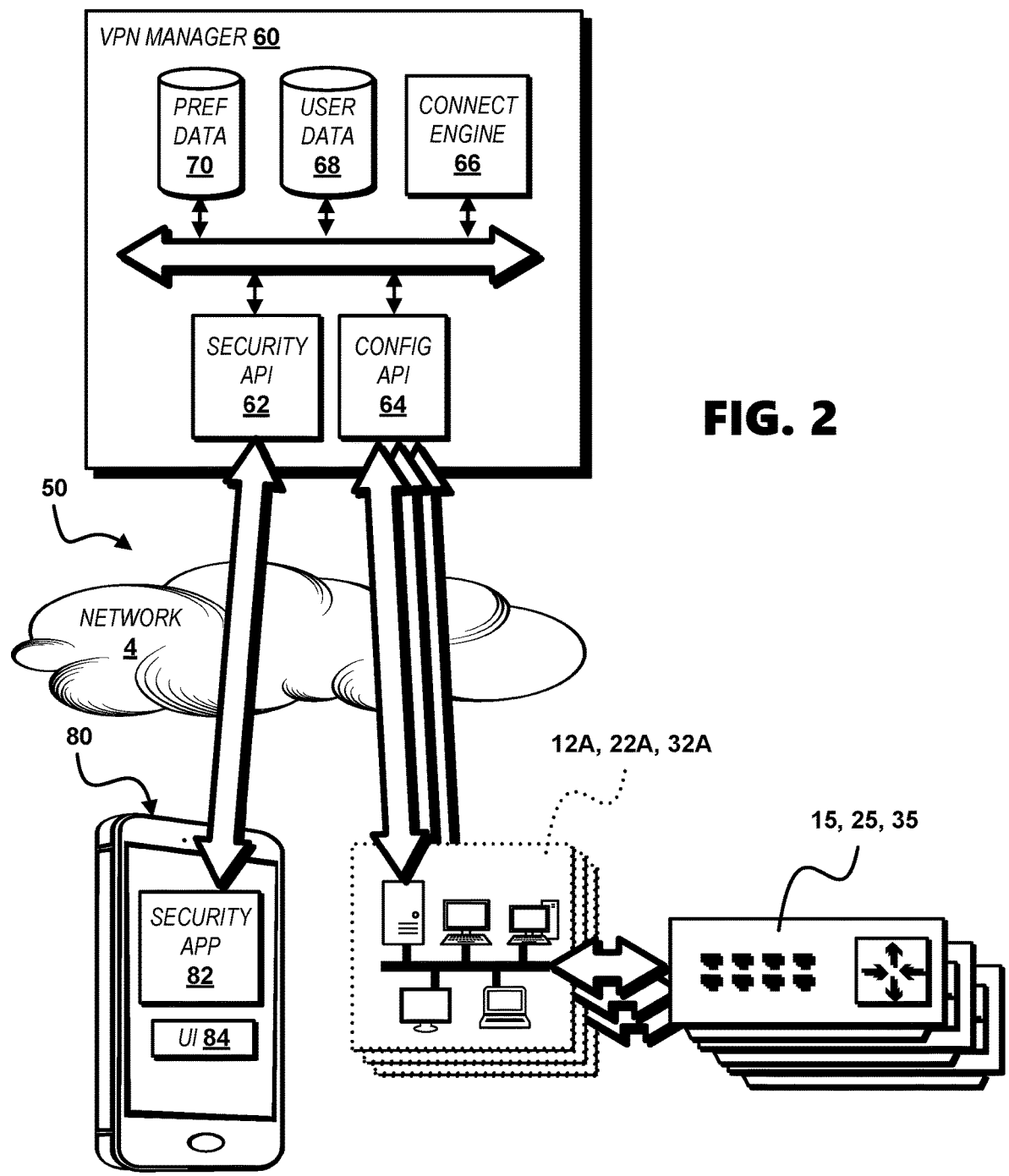
FIG. 2 is a diagram showing a VNF management system in a computer network.

The first, second, and third VNFs can be dynamically configured at each end-point on the first, second, and third edge clouds 16, 26, 36 (e.g., at employee or owner home location and employee or owner office location). Referring to FIGS. 1 and 2, a virtual network function ("VNF") management system 50 is provided in the communications network 4. For convenience of illustration, the management system 50 is described with reference to the LANs 12A, 22A, 32A as operated by the first user. However, one skilled in the art would understand that the following description could apply to the LANs 12B, 22B, 32B operated by the second user or other users. The management system 50 permits an authorized user operating a security application 82 on a computing device 80 to dynamically configure VNFs at end-points, for example on the first, second, and third edge clouds 16, 26, 36 enabled by universal customer premises equipment ("uCPE") 15, 25, 35, or virtual customer premises equipment ("vCPE") within the LANs 12A, 22A, 32A. A security application program interface ("API") 62 of a network-connectable processor-enabled VPN manager 60 receives user instructions from the security application 82, which instructions are rendered accessible via a configuration API 64 to one or more of a computing system, a universal customer premises equipment ("uCPE") 15, 25, 35, or a virtual customer premises equipment ("vCPE") within the LANs 12A, 22A, 32A. A user for example can include a CISO or an owner of an SMB.

A user is further enabled to setup and tear-down the multisite LAN 10 via the security application 82 in communication with the security API 62. The VPN manager 60 transmits the user's instructions to the LANs 12A, 22A, 32A via the configuration API 64 in communication with one or more of a computing system, the universal customer premises equipment ("uCPE") 15, 25, 35, or a virtual customer premises equipment ("vCPE") within the LANs 12A, 22A, 32A. Instructions provided by a user via the security application 82 permit joining and unjoining of the LANs 12A, 22A, 32A or other LANs to the multisite LAN 10 or other multisite LANs via the respective uCPE 15, 25, 35 or a virtual customer premises equipment ("vCPE") or other system within the LANs 12A, 22A, 32A. User information can be stored in a user datastore 68 and user instructions can be stored in a preference datastore 70 which data can be compiled by a connection engine 66 to effect the configuring of VNFs and LANs via the configuration API 64.

In an example implementation of the multisite LAN 10, the first, second, and third edge clouds 16, 26, 36 can be emulated using an open source cloud computing infrastructure (e.g., OpenStack™), with each LAN (e.g., LAN 12A)

including two virtual machines ("VMs") behind each edge cloud 16, 26, 36, and with one of the VMs of each LAN emulating a VPN host (i.e., a VNF). The multisite LAN 10 as described enables and supports security protection which spans LAN devices, LANs, and edges across national and global networks.

Figure 3:
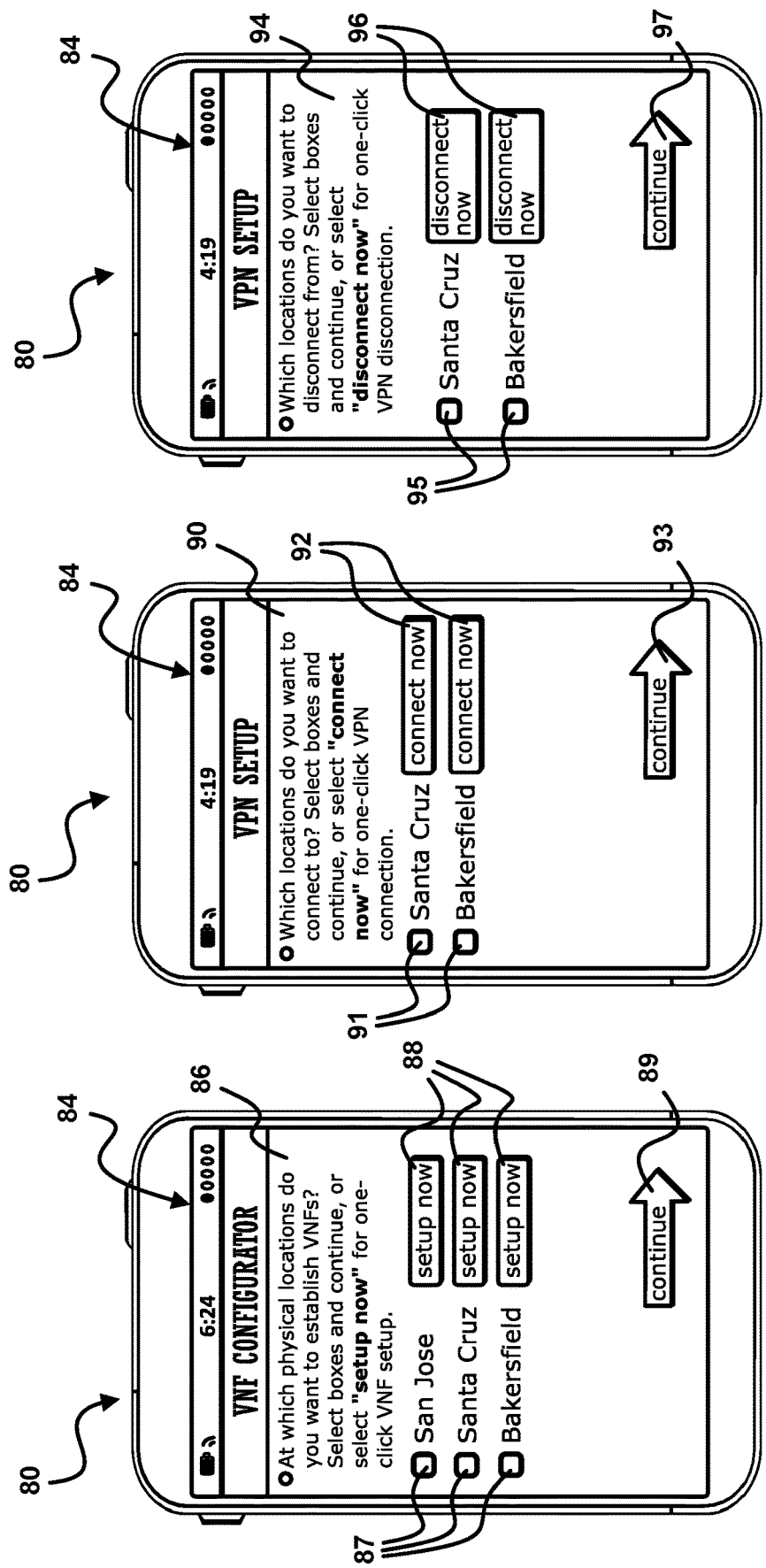
FIG. 3A shows in a user interface of a computing device an exemplary interactive display for entering and editing settings for establishing VNFs at particular locations.
FIG. 3B shows in a user interface of a computing device an exemplary interactive display for connecting to particular locations via a virtual private network ("VPN").
FIG. 3C shows in a user interface of a computing device an exemplary interactive display for disconnecting a VPN from a particular location.

Referring to FIGS. 2 and 3A-3C, a user interface 84 enabled by the security application 82 on a computing device 80 provides exemplary interactive displays 86, 90, 94 for entering and editing settings by a particular user, for example a CISO or an owner of an SMB. Referring to FIGS. 1, 2 and 3A a first exemplary interactive display 86 in a user interface 84 of the computing device 80 queries a user "At which physical locations do you want to establish VNFs?" The user interface 84 further instructs "Select boxes and continue, or select 'setup now' for one-click VNF setup." A user is enabled to select boxes 87 and actuate a continue button 89 to enable one or more VNFs connected to LANs at one or more chosen particular physical locations including "San Jose," Santa Cruz," and "Bakersfield." The one or more VNFs can include for example the first, second, and third VNFs on the first, second, and third edge clouds 16, 26, 36 as enabled for instance by the respective uCPE 15, 25, 35. Alternatively, the user can actuate one or more setup now buttons 88 to enable the one or more VNFs with one click.

Referring to FIGS. 1, 2 and 3B, a second exemplary interactive display 90 in the user interface 84 of the computing device 80 queries a user "Which locations do you want to connect to [via VPN]?" The user interface 84 further instructs "Select boxes and continue, or select 'connect now' for one-click VPN connection." A user is enabled to select boxes 91 and actuate a continue button 93 to connect to one or more LANs via VPN tunnels enabled by VNFs at one or more chosen physical locations including "Santa Cruz" or "Bakersfield." The one or more LANs can include for example the first, second, and third LANs 12A, 22A, 32A behind the first, second, and third VNFs on the first, second, and third edge clouds 16, 26, 36, which can be connected via the VPN tunnels 14A, 24A, 34A, as enabled for instance by the respective uCPE 15, 25, 35. Alternatively, the user can actuate one or more connect now buttons 92 to connect via VPN to one or more LANs at chosen physical locations.

Referring to FIGS. 1, 2 and 3C, a third exemplary interactive display 94 in the user interface 84 of the computing device 80 queries a user "Which locations do you want to disconnect [a VPN] from?" The user interface 84 further instructs "Select boxes and continue, or select 'disconnect now' for one-click VPN disconnection." A user is enabled to select boxes 95 and actuate a continue button 97 to disconnect one or more connected VPN tunnels from one or more LANs enabled by VNFs at chosen physical locations including "Santa Cruz" or "Bakersfield." The one or more VPN tunnels can include for example the VPN tunnels 14A, 24A, 34A connecting the first, second, and third LANs 12A, 22A, 32A behind the first, second, and third VNFs on the first, second, and third edge clouds 16, 26, 36, as enabled for instance by the respective uCPE 15, 25, 35. Alternatively, the user can actuate one or more disconnect now buttons 96 to disconnect one or more VPN tunnels from one or more LANs.

Figure 4:
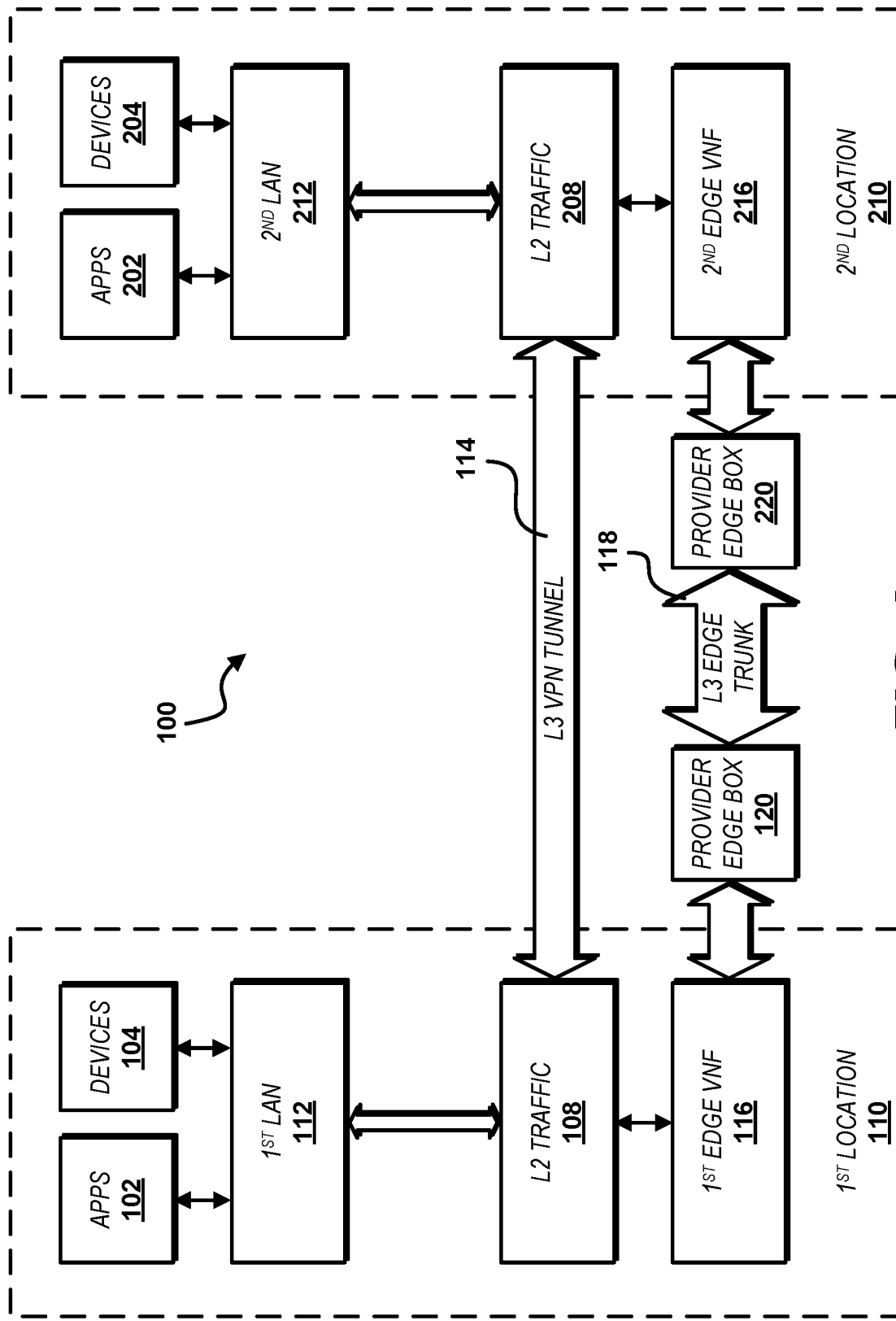
FIG. 4 is a diagram showing an inter-site architecture of an exemplary VNF-enabled multisite LAN.

Referring to FIG. 4, a diagram shows inter-site architecture 100 of an exemplary VNF-enabled multisite LAN connecting a first geographic location 110 and a second geographic location 210. The first geographic location 110 includes a first LAN 112 (e.g., IPv4 address: 192.168.10.0/24) which supports communication by applications 102 (e.g., home office applications) and devices 104 (e.g., personal computers, tablets, mobile phones). The second geographic location 210 includes a second LAN 212 (e.g., IPv4 address: 192.168.20.0/24) which supports communication by other applications 202 (e.g., office applications) and other devices 204 (e.g., personal computers, tablets, mobile phones, printers, IP phones). The first geographic location 110 can for example correspond to the home or personal residence of a business owner or employee, and the second geographic location 210 can for example correspond to an office or place of work of the business owner or employee.

Layer 2 ("L2") traffic 108 from the first LAN 112 and L2 traffic 208 from the second LAN 212 is communicated between the first and second LANs 112, 212 via an L3 VPN tunnel (e.g., IPv4 address: 10.20.20.0/24) constructed by a first edge-located VNF 116 at the first geographic location 110 and a second edge-located VNF 216 at the second geographic location 210. The L3 VPN tunnel 114 enables secure transmission of payload, beneficially including L2 packets encapsulated by outer headers and provider labels, via Multi-Protocol Label Switching ("MPLS"). The L3 VPN tunnel forms a portion of an L3 edge trunk 118 supported by one or more telecommunication providers via a first telecommunication provider edge ("PE") box 120 and a second telecommunication PE box 220.

Figure 5:
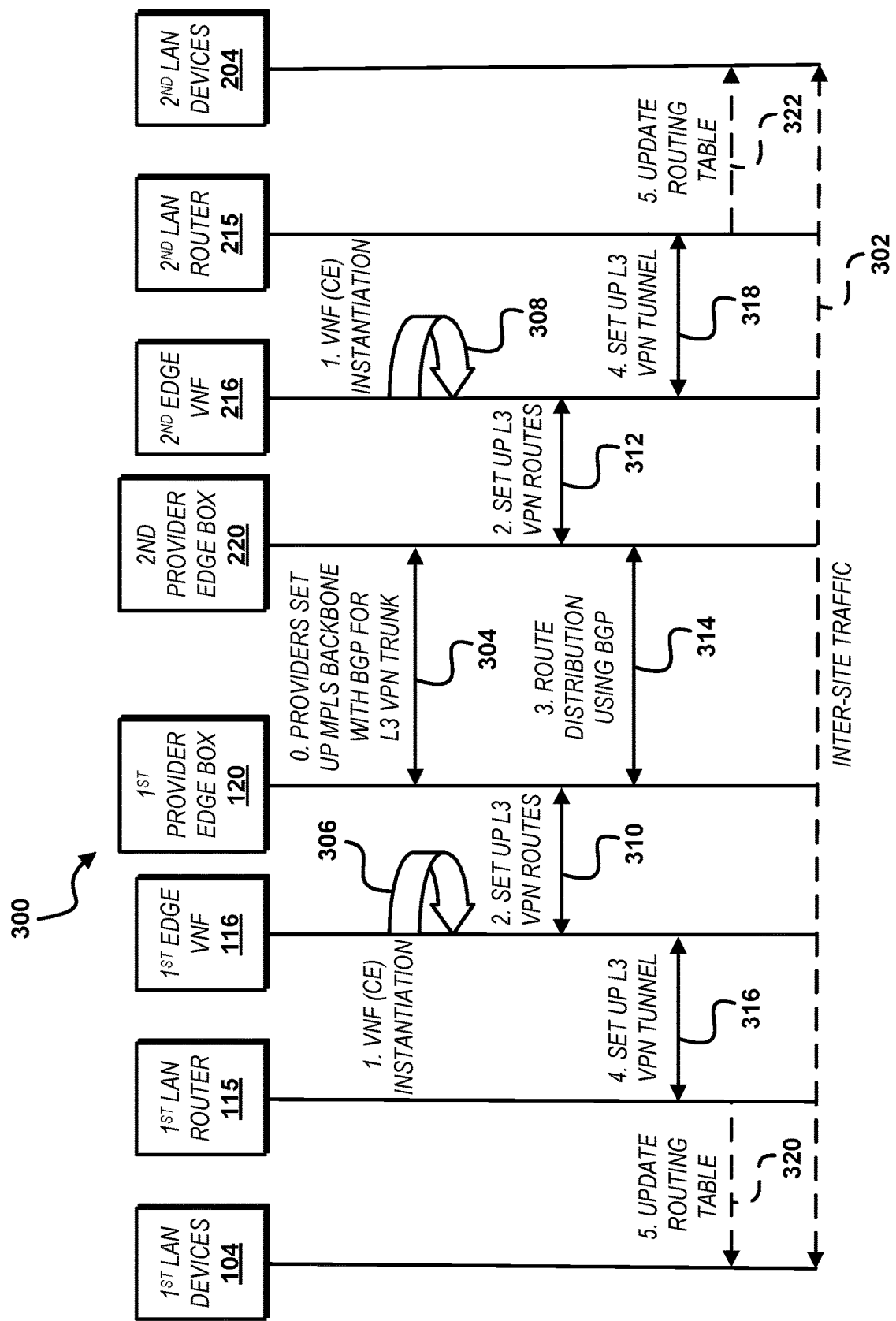
FIG. 5 is a diagram showing a process flow of a bootstrapping process for initiating a Layer 3 ("L3") VPN tunnel.

Referring to FIGS. 2 and 5, a process flow is shown of an exemplary bootstrapping process 300 for initiating an L3 VPN tunnel 114 using the architecture 100 to enable inter-site traffic 302. Initially, telecommunication providers set up an MPLS backbone with border gateway protocol ("BGP", e.g., MP-BGP) or other suitable protocol (e.g., OpenFlow) for distributing routes from VRF routing tables to support an L3 VPN trunk between the first PE box 120 and the second PE box 220 (step 304). Alternatively instead of MPLS, other tunneling methods such as VxLan, UDP, or GRE can be used. A first network service is instantiated to initiate the first edge-located VNF 116 (step 306). A second network service is instantiated to initiate the second edge-located VNF 216 (step 308). L3 VPN routes are established by the first edge-located VNF 116 between the first edge-located VNF 116 and the first PE box 120 (step 310). The L3 VPN routes are further established by the second edge-located VNF 216 between the second edge-located VNF 216 and the second PE box 220 (step 312). The telecommunication providers distribute the L3 VPN routes between the first PE box 120 and the second PE box 220 via BGP (e.g., MP-BGP, step 314), or alternatively via other protocol (e.g., OpenFlow). An L3 VPN tunnel is established by the first edge-located VNF 116 between the first edge-located VNF 116 and a first LAN router 115 in the first LAN 112 (step 316). The L3 VPN tunnel is further established by the second edge-located VNF 216 between the second edge-located VNF 216 and a second LAN router 215 in the second LAN 212 (step 318). Establishing the L3 VPN includes updating internet protocol ("IP") addresses (e.g., IPv4, IPv6, IP multicast, VPNv4). A routing table of the first LAN router 115 is updated to reflect the updated IP addresses (step 320). Further, a routing table of the second LAN router 215 is updated to reflect the updated IP addresses (step 322).

Referring to FIG. 6A, a diagram shows a method 400 for enabling secure communication. In a step 402, a first virtual network function ("VNF") is provided at a first network location. A second VNF is provided at a second network location (step 404). Beneficially, the first VNF is provided on a first edge cloud at the first network location, and the second VNF is provided on a second edge cloud at the second network location. The first edge cloud and the second edge cloud can each be implemented on a universal customer premises equipment ("uCPE"), a virtual customer premises equipment ("vCPE"), or other suitable computing environment. The first VNF can be dynamically configured at the first network location at a first physical location, and the second VNF can be dynamically configured at the second network location at a second physical location.

Providing the first VNF beneficially includes enabling a first user interface and receiving an instruction from a first user to enable the first VNF at the at the first network location via the first user interface, wherein providing the first VNF at the first network location is responsive to receiving the instruction from the first user to enable the first VNF at the first network location. The instruction to enable can include for example a one-click instruction via the first user interface. Moreover, an instruction can be received from the first user to disable the first VNF at the first network location via the first user interface, and the first VNF can be disabled at the first network location via the first user interface responsive to the instruction from the first user to disable the first VNF at the first network location. The instruction to disable can include for example a one-click instruction via the first user interface.

Further, providing the second VNF beneficially includes enabling the first user interface or a second user interface and receiving an instruction from the first user or a second user to enable the second VNF at the second network location via the first user interface or the second user interface, wherein providing the second VNF at the second network location is responsive to receiving the instruction from the first user or the second user to enable the second VNF at the second network location. The instruction to enable can include for example a one-click instruction via the first user interface or the second user interface. Moreover, the instruction can be received from the first user or the second user to disable the second VNF at the second network location via the first user interface or the second user interface, and the second VNF can be disabled at the second network location via the first or the second user interface responsive to the instruction from the first user or the second user to disable the second VNF at the second network location. The instruction to disable can include for example a one-click instruction via the first user interface or the second user interface.

A first Layer 3 virtual private network ("L3 VPN") tunnel is constructed by the first VNF and the second VNF between the first network location and the second network location (step 406), and a first local area network ("LAN") at the first network location and a second LAN at the second network location are connected by the first L3 VPN tunnel (step 408). A communication can be encrypted by the first VNF or the second VNF via the first L3 VPN tunnel. Layer 2 ("L2") packets can be transmitted from the first network location to the second network location and from the second network location to the first network location via the first L3 VPN tunnel. The L2 packets can be encapsulated by outer headers and provider labels to facilitate transmission. Beneficially, the first VNF is configured for detecting attacks and blocking attacks on the first LAN, and the second VNF is configured for detecting attacks and blocking attacks on the second LAN. The first VNF can monitor network traffic that terminates on the first edge cloud or the first LAN, and the first VNF can enable a security measure against the network traffic based on the monitoring. Further, the second VNF can monitor network traffic that terminates on the second edge cloud or the second LAN, and the second VNF can enable a security measure against the network traffic based on the monitoring. The first VNF can receive network traffic from the first LAN and the first VNF can masquerade the network traffic via the first L3 VPN tunnel. Further, the second VNF can receive network traffic from the second LAN and the second VNF can masquerade the network traffic via the first L3 VPN tunnel.

Referring to FIG. 6B, a diagram shows a method 420 which is an extension of the method 400 and continues from the step 408 of the method 400 at a step 422. In the step 422, a second L3 VPN tunnel is constructed by the first VNF and the second VNF between the first network location and the second network location. First data is received from a first user at the first network location (step 424). The first data is transmitted to the second network location via the first L3 VPN tunnel (step 426). Second data is received from a second user at the first network location (step 428), and the second data is transmitted to the second network location via the second L3 VPN tunnel (step 430).

Referring to FIG. 6C, a diagram shows a method 440 which is an extension of the method 400 and continues from the step 408 of the method 400 at a step 442. In the step 442, a third VNF is provided at a third network location. A second L3 VPN tunnel is constructed by the first VNF and the third VNF between the first network location and the third network location (step 444). Further, a third L3 VPN tunnel is constructed by the second VNF and the third VNF between the second network location and the third network location (step 446).

Referring to FIG. 7A, a diagram shows a method 500 for establishing a secure communication environment. In a step 502, a first network service is instantiated to initiate a first virtual network function ("VNF") at a first network location. Layer 3 virtual private network ("L3 VPN") routes are established by the first VNF between the first VNF and a first provider edge device (step 504) for distribution by a provider via a border gateway protocol ("BGP", e.g., "MP-BGP") or alternatively other suitable protocol (e.g., OpenFlow), and an L3 VPN tunnel is established by the first VNF between the first VNF and a first routing device at the first network location (step 506). Establishing the L3 VPN tunnel beneficially includes updating internet protocol ("IP") addresses (e.g., IPv4, IPv6, IP multicast, VPNv4), and the method 500 can further include updating a routing table of the first routing device to reflect the updated IP addresses.

Referring to FIG. 7B, a diagram shows a method 510 which is an extension of the method 500 and continues from the step 506 of the method 500 at a step 512. In the step 512, a second network service is instantiated to initiate a second VNF at a second network location. The L3 VPN routes are further established by the second VNF between the second VNF and a second provider edge device (step 514) for distribution by the provider via the BGP (e.g., "MP-BGP") or alternatively via other suitable protocol (e.g., OpenFlow), and the L3 VPN tunnel is further established by the second VNF between the second VNF and a second routing device at the second network location (step 516). The method 510 can further include updating a routing table of the second routing device to reflect the updated IP addresses.

FIG. 8 illustrates in abstract the function of an exemplary computer system 1000 on which the systems, methods and processes described herein can execute. For example, the computing device 80, VPN manager 60, and the uCPE 15, 25, 35 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 4, using a signal transmission medium via the network interface 1020 operating under one or more known transfer protocols, for example FTP, HTTP, or HTTPs. Examples of communication networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for enabling secure communication comprising:
providing a first virtual network function ("VNF") on a first edge cloud at a first network location;
providing a second VNF on a second edge cloud at a second network location;
constructing a first Layer 3 virtual private network ("L3 VPN") tunnel by the first VNF and the second VNF between the first network location and the second network location;
connecting a first local area network ("LAN") at the first network location and a second LAN at the second network location by the first L3 VPN tunnel;
transmitting via the first L3 VPN tunnel via Multi-Protocol Label Switching ("MPLS") a first plurality of Layer 2 ("L2") packets encapsulated by first outer headers and first provider labels;

providing a third VNF on a third edge cloud at a third network location;

constructing a second L3 VPN tunnel by the first VNF and the third VNF between the first network location and the third network location;

transmitting via the second L3 VPN tunnel via MPLS a second plurality of L2 packets encapsulated by second outer headers and second provider labels;

constructing a third L3 VPN tunnel by the second VNF and the third VNF between the second network location and the third network location; and transmitting via the third L3 VPN tunnel via MPLS a third plurality of L2 packets encapsulated by third outer headers and third provider labels.

2. The method of claim 1, further comprising:

receiving first data from a first user at the first network location;

transmitting the first data to the second network location via the first L3 VPN tunnel;

constructing a fourth L3 VPN tunnel by the first VNF and the second VNF between the first network location and the second network location;

receiving second data from a second user at the first network location; and transmitting the second data to the second network location via the fourth L3 VPN tunnel.

3. The method of claim 1, further comprising:

detecting by the first VNF an attack on the first LAN; and blocking by the first VNF the attack on the first LAN.

4. The method of claim 1, further comprising:

monitoring by the first VNF network traffic that terminates on the first edge cloud; and enabling by the first VNF a security measure against the network traffic based on the monitoring.

5. The method of claim 1, further comprising:

monitoring by the first VNF network traffic that terminates on the first LAN; and enabling by the first VNF a security measure against the network traffic based on the monitoring.

6. The method of claim 1, further comprising implementing the first edge cloud on a universal customer premises equipment ("uCPE").

7. The method of claim 1, further comprising implementing the first edge cloud on a virtual customer premises equipment ("vCPE").

8. The method of claim 1, further comprising encrypting by the first VNF a communication via the first L3 VPN tunnel.

9. The method of claim 1, further comprising:

receiving by the first VNF network traffic from the first LAN; and masquerading the network traffic by the first VNF via the first L3 VPN tunnel.

10. The method of claim 1, further comprising:

dynamically configuring the first VNF at the first network location at a first physical location; and dynamically configuring the second VNF at the second network location at a second physical location.

11. The method of claim 1, further comprising:

enabling a user interface;

receiving an instruction from a user to enable the first VNF at the first network location via the user interface, and providing the first VNF on the first edge cloud at the first network location responsive to receiving the instruction from the user to enable the first VNF at the first network location;

receiving an instruction from the user to disable the first VNF at the first network location via the user interface; and disabling the first VNF at the first network location via the user interface responsive to the instruction from the user to disable the first VNF at the first network location.

12. The method of claim 1, further comprising:

enabling a user interface;

receiving an instruction from a user to enable the first VNF at the first network location via the user interface, and providing the first VNF on the first edge cloud at the first network location responsive to receiving the instruction from the user to enable the first VNF at the first network location; and receiving an instruction from the user to enable the second VNF at the second network location via the user interface, and providing the second VNF on the second edge cloud at the second network location responsive to receiving the instruction from the user to enable the second VNF at the second network location.

13. The method of claim 1, further comprising:

enabling a user interface;

receiving an instruction from a user to enable the second VNF at the second network location via the user interface, and providing the second VNF on the second edge cloud at the second network location responsive to receiving the instruction from the user to enable the second VNF at the second network location;

receiving an instruction from the user to disable the second VNF at the second network location via the user interface; and disabling the second VNF at the second network location via the user interface responsive to the instruction from the user to disable the second VNF at the second network location.

14. The method of claim 13, the instruction from the user to enable the second VNF at the second network location comprising a one-click instruction from the user via the user interface.

15. The method of claim 13, the instruction from the user to disable the second VNF at the second network location comprising a one-click instruction from the user via the user interface.

16. The method of claim 1, further comprising transmitting the first plurality of L2 packets from the first network location to the second network location via the first L3 VPN tunnel.

17. The method of claim 16, further comprising encapsulating the first plurality of L2 packets by the first outer headers and the first provider labels.

18. The method of claim 1, further comprising:

instantiating a first network service to initiate the first VNF on the first edge cloud at the first network location;

establishing Layer 3 virtual private network ("L3 VPN") routes by the first VNF between the first VNF and a first provider edge device for distribution by a provider via a border gateway protocol ("BGP"); and establishing the first L3 VPN tunnel by the first VNF between the first VNF and a first routing device at the first network location.

19. The method of claim 18, wherein establishing the first L3 VPN tunnel comprises updating a plurality of internet protocol ("IP") addresses, the method further comprising updating a routing table of the first routing device to reflect the updated plurality of IP addresses.

20. The method of claim 19, the plurality of IP addresses comprising a series of IP address families comprising at least one of IPv4, IPv6, IP multicast, or VPNv4.

* * * * *